United States Patent
Katagawa et al.

(10) Patent No.: US 12,493,967 B2
(45) Date of Patent: Dec. 9, 2025

(54) IMAGE PROCESSING APPARATUS AND IMAGE PROCESSING METHOD

(71) Applicant: CANON KABUSHIKI KAISHA, Tokyo (JP)

(72) Inventors: Hiroyasu Katagawa, Kanagawa (JP); Yasushi Ohwa, Tokyo (JP); Takahiro Usami, Tokyo (JP); Hiroyuki Yaguchi, Chiba (JP); Toru Aida, Tokyo (JP); Tomotaka Uekusa, Kanagawa (JP); Yukihiro Kogai, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 360 days.

(21) Appl. No.: 18/297,716

(22) Filed: Apr. 10, 2023

(65) Prior Publication Data
US 2023/0342946 A1 Oct. 26, 2023

(30) Foreign Application Priority Data
Apr. 26, 2022 (JP) .................. 2022-072675

(51) Int. Cl.
| G06T 7/20 | (2017.01) |
| G06T 5/50 | (2006.01) |
| G06V 10/70 | (2022.01) |
| H04N 23/65 | (2023.01) |
| H04N 23/67 | (2023.01) |

(52) U.S. Cl.
CPC ............. *G06T 7/20* (2013.01); *G06T 5/50* (2013.01); *G06V 10/70* (2022.01); *H04N 23/651* (2023.01); *H04N 23/675* (2023.01); *G06T 2207/20221* (2013.01)

(58) Field of Classification Search
None
See application file for complete search history.

(56) References Cited

U.S. PATENT DOCUMENTS

| 9,894,339 | B2 | 2/2018 | Uekusa | |
| 10,015,431 | B2 | 7/2018 | Uekusa | |
| 10,277,810 | B2 | 4/2019 | Yaguchi | |
| 2009/0060274 | A1* | 3/2009 | Kita | ........ H04N 23/61 382/103 |
| 2019/0138834 | A1* | 5/2019 | Collet Romea | ....... G06T 19/006 |
| 2019/0311217 | A1* | 10/2019 | Tsuji | ....................... H04N 23/60 |
| 2021/0303846 | A1* | 9/2021 | Yoneyama | .............. G06T 7/248 |
| 2023/0336862 | A1 | 10/2023 | Uekusa | |

FOREIGN PATENT DOCUMENTS

JP 2017-156886 A 9/2017

* cited by examiner

*Primary Examiner* — David Ometz
(74) *Attorney, Agent, or Firm* — Carter, DeLuca & Farrell LLP

(57) ABSTRACT

An image processing apparatus comprises a first tracking circuit configured to apply machine learning (ML)-based first tracking processing to images and a second tracking circuit configured to apply non-ML-based second tracking processing to the images. The apparatus controls operations of the first and second tracking circuits so that an operation frequency of the first tracking circuit to be lower than an operation frequency of the second tracking circuit.

18 Claims, 7 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method, and particularly relates to subject tracking technology.

Description of the Related Art

There is known a subject tracking function for tracking, over time, a specific region of images shot in time series, such as a moving image. Conventionally, the subject tracking function has been realized by template matching, in which a tracked region is used as a template and a search is performed for a region having the highest correlation with the template. On the other hand, in recent years, a subject tracking function using machine learning (ML) such as deep learning (DL) has been proposed (Japanese Patent Laid-Open No. 2017-156886).

The use of machine learning realizes tracking with higher accuracy as compared to when template matching is used. However, the use of machine learning necessitates an enormous amount of computation, and a circuit with high performance and high power consumption needs to be used for high-speed execution. However, in a battery-powered apparatus such as an image capture apparatus, an increase in power consumption leads to a reduction in operable time.

SUMMARY OF THE INVENTION

In one aspect thereof, the present invention provides an image processing apparatus and an image processing method that allow a subject tracking function using machine learning to be used while suppressing an increase in power consumption.

According to an aspect of the present invention, there is provided an image processing apparatus comprising: one or more processors that execute a program stored in a memory and thereby function as: a first tracking unit configured to apply machine learning (ML)-based first tracking processing to images; a second tracking unit configured to apply non-ML-based second tracking processing to the images; and a control unit configured to control operations of the first and second tracking units, wherein the control unit controls the operations of the first and second tracking unit so that an operation frequency of the first tracking unit to be lower than an operation frequency of the second tracking unit.

According to another aspect of the present invention, there is provided an image processing apparatus comprising: one or more processors that execute a program stored in a memory and thereby function as: an acquiring unit configured to acquire images having a predetermined frame rate; a first tracking unit configured to apply machine learning (ML)-based first tracking processing to the images; a second tracking unit configured to apply non-ML-based second tracking processing to the images; and a processing unit configured to execute processing in which a result of the first tracking processing or the second tracking processing is used, wherein a time required for the first tracking processing is longer than one frame period of the images, and a time required for the second tracking processing is shorter than the one frame period, and the processing unit uses a result of the second tracking processing for frames for which a result of the first tracking processing is not available.

According to a further aspect of the present invention, there is provided an image capture apparatus comprising: an image sensor; and an image processing apparatus using images obtained by the image sensor, wherein the image processing apparatus comprising: one or more processors that execute a program stored in a memory and thereby function as: a first tracking unit configured to apply machine learning (ML)-based first tracking processing to images; a second tracking unit configured to apply non-ML-based second tracking processing to the images; and a control unit configured to control operations of the first and second tracking units, wherein the control unit controls the operations of the first and second tracking unit so that an operation frequency of the first tracking unit to be lower than an operation frequency of the second tracking unit.

According to another aspect of the present invention, there is provided an image capture apparatus comprising: an image sensor; and an image processing apparatus using an image obtained by the image sensor, wherein the image processing apparatus comprising: one or more processors that execute a program stored in a memory and thereby function as: an acquiring unit configured to acquire images having a predetermined frame rate; a first tracking unit configured to apply machine learning (ML)-based first tracking processing to the images; a second tracking unit configured to apply non-ML-based second tracking processing to the images; and a processing unit configured to execute processing in which a result of the first tracking processing or the second tracking processing is used, wherein a time required for the first tracking processing is longer than one frame period of the images, and a time required for the second tracking processing is shorter than the one frame period, and the processing unit uses a result of the second tracking processing for frames for which a result of the first tracking processing is not available.

According to a further aspect of the present invention, there is provided an image processing method to be executed by an image processing apparatus, the image processing apparatus including a first tracking circuit configured to apply machine learning (ML)-based first tracking processing to images and a second tracking circuit configured to apply non-ML-based second tracking processing to the images, wherein the image processing method comprising: controlling operations of the first and second tracking circuits so that an operation frequency of the first tracking circuit to be lower than an operation frequency of the second tracking circuit.

According to another aspect of the present invention, there is provided a non-transitory machine-readable medium that has stored therein a program for causing a computer to function as an image processing apparatus comprising: a first tracking unit configured to apply machine learning (ML)-based first tracking processing to images; a second tracking unit configured to apply non-ML-based second tracking processing to the images; and a control unit configured to control operations of the first and second tracking units, wherein the control unit controls the operations of the first and second tracking unit so that an operation frequency of the first tracking unit to be lower than an operation frequency of the second tracking unit.

According to a further aspect of the present invention, there is provided a non-transitory machine-readable medium that has stored therein a program for causing a computer to function as an image processing apparatus comprising: an acquiring unit configured to acquire images having a predetermined frame rate; a first tracking unit configured to apply machine learning (ML)-based first tracking processing to the images; a second tracking unit configured to apply non-ML-based second tracking processing to the images; and a processing unit configured to execute processing in which a result of the first tracking processing or the second tracking processing is used, wherein a time required for the first tracking processing is longer than one frame period of the images, and a time required for the second tracking processing is shorter than the one frame period, and the processing unit uses a result of the second tracking processing for frames for which a result of the first tracking processing is not available.

Further features of the present invention will become apparent from the following description of exemplary embodiments (with reference to the attached drawings).

DESCRIPTION OF THE EMBODIMENTS

Figure 1:
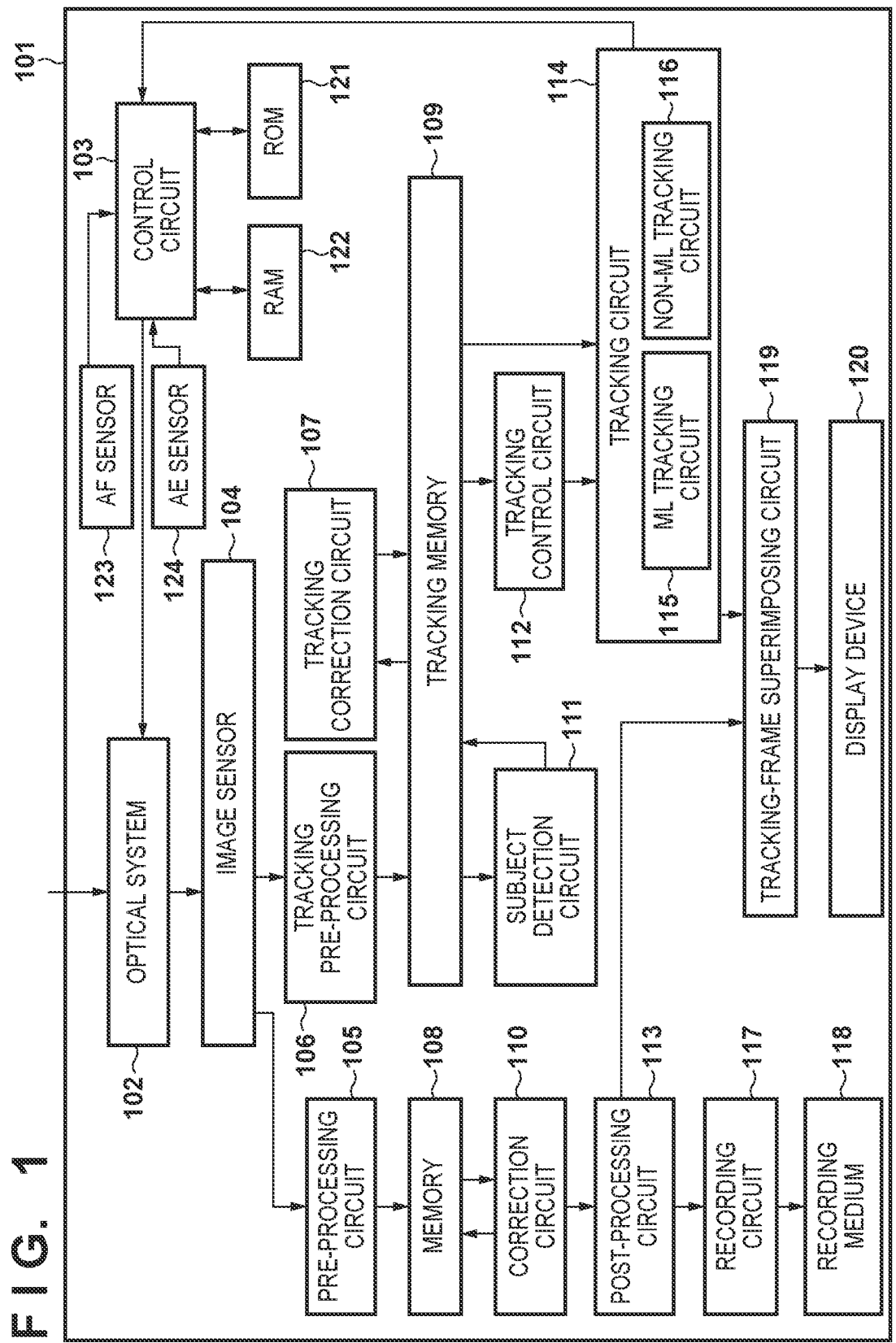
FIG. 1 is a block diagram illustrating an example of a functional configuration of a digital camera that is one example of an image processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, in the following embodiment, a case will be described in which the present invention is applied to a digital camera. However, the present invention is also applicable to any electronic device having an image capture function. Such electronic devices include video cameras, computer devices (personal computers, tablet computers, media players, PDAs, etc.), mobile phones, smartphones, game machines, robots, drones, and drive recorders. These are only examples; the present invention is also applicable to other electronic devices.

First Embodiment

FIG. 1 is a block diagram illustrating an example of a functional configuration of a digital camera 101 that is one example of an image processing apparatus according to a first embodiment of the present invention.

An optical system 102 is a lens unit including a plurality of lenses, and forms an optical image of a subject on an imaging surface of an image sensor 104.

For example, the image sensor 104 may be a known CCD or CMOS color image sensor including color filters in a primary-color Bayer array. The image sensor 104 includes a pixel array in which a plurality of pixels are two-dimensionally arranged, and a peripheral circuit for reading signals from the pixels. By means of photoelectric conversion, each pixel accumulates electric charge corresponding to an incident light amount. A pixel signal group (analog image signal) indicating the subject image formed on the imaging surface is obtained by reading, from each pixel, a signal corresponding to the amount of electric charge accumulated during an exposure period.

A control circuit 103 includes one or more processors (hereinafter, referred to as "CPUs") that can execute programs. By loading and executing, on a RAM 122, programs stored in a ROM 121, the control circuit 103 controls the operations of the units of the digital camera 101 and realizes the functions of the digital camera 101. The control circuit 103 is communicably connected to the blocks whose operations are to be controlled by the control circuit 103.

For example, the ROM 121 is electrically rewritable, and stores programs that the CPUs of the control circuit 103 can execute, setting values of the digital camera 101, data of a GUI to be displayed on a display device 120, etc.

The RAM 122 is used to load programs executed by the CPUs of the control circuit 103, and to store necessary values during the execution of programs. Note that the RAM 122 and the later-described tracking memory 109 and memory 108 may be implemented as allocated regions of a single memory space.

An AF sensor 123 generates a pair of signals for performing auto-focus detection (AF) according to the phase-difference detection method with respect to a focus detection region set in advance within an imaging area, and outputs the signal pair to the control circuit 103. The control circuit 103 calculates a phase difference between the pair of signals acquired from the AF sensor 123, and converts the phase difference into a defocus amount. Furthermore, the control circuit 103 focuses the optical system 102 to the focus detection region by controlling the position of a focus lens included in the optical system 102 in accordance with the defocus amount.

An AE sensor 124 generates luminance information for the entirety of and/or a specific part of the imaging area, and outputs the luminance information to the control circuit 103. The control circuit 103 executes AE processing for determining exposure conditions based on exposure settings and the luminance information acquired from the AE sensor 124. For example, the exposure conditions are a combination of a shutter speed or exposure time, an aperture value, and photosensitivity.

Note that the AF and AE processing described above are mere examples, and the control circuit 103 can adjust the in-focus distance of the optical system 102 and determine the exposure conditions using any one of various known methods. For example, the control circuit 103 can set the focus detection region to a subject region, and determine the exposure conditions so that a subject region is appropriately exposed.

An analog image signal that corresponds to a still image or one moving-image frame and has been shot by and read from the image sensor 104 is supplied to a pre-processing circuit 105 and a tracking pre-processing circuit 106.

In this analog image signal read from the image sensor 104, a signal for each pixel has one color component corresponding to the color filter provided to the pixel, and the analog image signal is referred to as a RAW-format image signal. Because the image sensor 104 includes color filters of the primary-color Bayer array in the present embodiment, each pixel signal constituting the RAW-format image signal has one of the R, G, and B color components.

The pre-processing circuit 105 generates image data corresponding to one frame in which pixel data has all color components (the R, G, and B components) by applying A/D conversion and color interpolation processing to the RAW-format analog image signal read from the image sensor 104. The pre-processing circuit 105 stores the generated image data to the memory 108. The memory 108 has a capacity capable of storing image data corresponding to two or more frames. Thus, the pre-processing circuit 105 and a correction circuit 110 can perform processing using image data corresponding to multiple frames.

The correction circuit 110 applies white-balance correction, shading correction, etc., to the image data stored in the memory 108. Furthermore, the correction circuit 110 stores the corrected image data to the memory 108. Note that the correction circuit 110 may store the corrected image data to the memory 108 after converting the corrected image data into the YUV format from the RGB format.

A post-processing circuit 113 generates image data for recording (hereinafter, referred to as "recording image data") and image data for display (hereinafter, referred to as "display image data") by applying, to the corrected image data, image processing that is in accordance with the purposes of use. For example, the post-processing circuit 113 generates the display image data and the recording image data by applying scaling to a resolution suitable for displaying or applying encoding processing corresponding to a predetermined recording format. Note that, if recording is unnecessary, the post-processing circuit 113 generates only the display image data.

For live-view display on the display device 120, the image sensor 104 shoots a moving image, and the pre-processing circuit 105, the correction circuit 110, and the post-processing circuit 113 generate the display image data so that a live-view image is displayed at a predetermined frame rate on the display device 120.

The post-processing circuit 113 outputs the recording image data and the display image data to a recording circuit 117 and a tracking-frame superimposing circuit 119, respectively.

The recording circuit 117 records, to a recording medium 118, the recording image data obtained through the conversion by the post-processing circuit 113. For example, the recording medium 118 is a memory card. Note that the recording medium 118 may be an external storage device.

Similarly to the pre-processing circuit 105, the tracking pre-processing circuit 106 generates image data from the analog image signal read from the image sensor 104, and stores the generated image data to the tracking memory 109. The memory 109 has a capacity capable of storing image data corresponding to two or more frames. Thus, the tracking pre-processing circuit 106 and a tracking correction circuit 107 can perform processing using image data corresponding to multiple frames.

Similarly to the correction circuit 110, the tracking correction circuit 107 applies white-balance correction, shading correction, etc., to the image data stored in the tracking memory 109. Furthermore, the tracking correction circuit 107 stores the corrected image data to the tracking memory 109. Note that the tracking correction circuit 107 may store the corrected image data to the tracking memory 109 after converting the corrected image data into the YUV format from the RGB format.

Furthermore, the tracking correction circuit 107 may apply image processing for improving subject-detection accuracy to the corrected image data. For example, if the average luminance of the corrected image data does not exceed a threshold, the tracking correction circuit 107 may apply image processing for improving the luminance of the entire image data. This image processing may be processing of multiplying the values of the individual pieces of pixel data by a certain coefficient.

Note that processing that is commonly performed by the pre-processing circuit 105 and the tracking pre-processing circuit 106 may be performed by only one of the pre-processing circuit 105 and the tracking pre-processing circuit 106, and the processed image data may be passed to the other. This similarly applies to the correction circuit 110 and the tracking correction circuit 107. Alternatively, the display image data generated by the post-processing circuit 113 may also be output to the memory 109 to be used for tracking. In this case, the tracking pre-processing circuit 106 is unnecessary. The tracking correction circuit 107 applies the image processing for improving subject-detection accuracy to the display image data stored in the tracking memory 109.

A subject detection circuit 111 detects, from image data for tracking process (hereinafter, referred to as "tracking image data") corresponding to one frame stored in the tracking memory 109, one or more regions (subject regions) each inferred as including a certain subject. For example, the subject detection circuit 111 may be realized using a machine learning (ML)-based multi-class classifier. The classifier may be realized using a known machine learning algorithm (model), such as a multi-class logistic regression or support vector machine, a random forest, or a neural network.

In regard to each detected subject region, the subject detection circuit 111 acquires information including the type (class) of the subject, the position in the image, and the size. Note that, when a plurality of subject regions of the same class are detected, the subject detection circuit 111 chooses one subject region. For example, the subject detection circuit 111 may rank the priorities of the individual subject regions based on one or more among predetermined conditions such as size, position, and detection reliability, and choose the subject region having the highest priority rank. For example, regions that are larger in size and regions located closer to the focus detection region may be provided with higher priority ranks.

A tracking control circuit 112 controls the operation of a tracking circuit 114; specifically, the tracking control circuit 112 controls the activation and deactivation of the two tracking circuits included in the tracking circuit 114. The operation of the tracking control circuit 112 will be described in detail later.

The tracking circuit 114 executes tracking processing for estimating the position where a subject region to be tracked is present in the image expressed by the tracking image data. The tracking circuit 114 outputs a result of the tracking processing (e.g., the position and size of the subject region) to the control circuit 103 and a tracking-frame superimposing circuit 119. When subject regions of multiple types are detected by the subject detection circuit 111, the tracking circuit 114 executes the tracking processing for each individual subject region.

In the present embodiment, the tracking circuit 114 includes an ML tracking circuit 115 that is an ML-based tracking circuit that estimates subject-region positions using machine learning, and a non-ML tracking circuit 116 that is a non-ML-based tracking circuit that estimates subject-region positions without using machine learning. Here, the ML tracking circuit 115 estimates subject-region positions using deep learning (DL) as one example of machine learning. On the other hand, the non-ML tracking circuit 116 estimates subject-region positions using a known method in which machine learning is not used. For example, the non-ML tracking circuit 116 may estimate the position of a subject region in a current frame based on the similarity with a subject region estimated in a past frame. Specifically, the non-ML tracking circuit 116 may estimate the position of the subject region based on the total of differences between pixel values of corresponding positions (pattern matching), the similarity of pixel color histograms, the similarity of distance information, etc.

The ML tracking circuit 115 and the non-ML tracking circuit 116 may each be realized using hardware, software, or a combination thereof. However, while results with higher accuracy can be obtained with the ML tracking processing (first tracking processing) than with the non-M tracking processing (second tracking processing), the processing load of the ML tracking processing (first tracking processing) is high. Thus, high-performance hardware with high power consumption is necessary to perform the ML tracking processing at the same frequency as the non-M tracking processing. Furthermore, if the non-ML tracking processing and the ML tracking processing are performed using pieces of hardware with similar performance, the time required for the ML tracking processing would be longer than that required for the non-ML tracking processing.

The ML tracking circuit 115 and the non-ML tracking circuit 116 can operate in parallel. The tracking control circuit 112 achieves both tracking responsiveness and accuracy while suppressing power consumption by appropriately controlling the operations of the ML tracking circuit 115 and the non-ML tracking circuit 116.

The ML tracking circuit 115 may be implemented as a multilayer neural network including one or more convolution layers. The ML tracking circuit 115 automatically extracts features points and feature amounts included in the feature points from tracking image data based on parameter settings set as a result of advance learning. Furthermore, the ML tracking circuit 115 has the function of associating feature points in different frames with one another based on parameter settings set as a result of advance learning using a data set of feature points and a data set of feature amounts included in the feature points.

The ML tracking circuit 115 estimates the position of a subject region in processing-target tracking image data by associating feature points with one another based on feature points and feature amounts automatically extracted from the processing-target tracking image data, and feature points and feature amounts of the subject region to be tracked. The ML tracking circuit 115 outputs the estimated position and size of the subject region as a result of the tracking processing. The position may for example be the center or center-of-gravity coordinates of the region, and the size may for example be horizontal- and vertical-direction pixel counts.

As described above, the non-ML tracking circuit 116 estimates the position of a subject region in processing-target tracking image data based on a similarity in color, luminance, etc. Similarly to the ML tracking circuit 115, the non-ML tracking circuit 116 also outputs the estimated position and size of the subject region as a result of the tracking processing. The non-ML tracking circuit 116 holds therein or stores to the tracking memory 109 information that is included in the result of the tracking processing and is necessary for the next iteration of the tracking processing. For example, if a subject-region image is being used as a template, the non-ML tracking circuit 116 updates the template with the subject-region image obtained as a result of the tracking processing.

The control circuit 103 may use the position and size of a subject region output by the tracking circuit 114 for the AF processing and the AE processing, for example. For example, the control circuit 103 may set the focus detection region so as to include the subject region, or determine exposure conditions such that the subject region is appropriately exposed.

The tracking-frame superimposing circuit 119 includes a video memory for the display device 120. The tracking-frame superimposing circuit 119 stores display image data output by the post-processing circuit 113 to the video memory. In addition, the tracking-frame superimposing circuit 119 generates a frame-shaped image (hereinafter, referred to as a "tracking-frame") based on the size of a subject region output by the tracking circuit 114. Furthermore, the tracking-frame superimposing circuit 119 writes data of the tracking-frame to the video memory based on the position of the subject region output by the tracking circuit 114. Thus, display image data having superimposed thereon a tracking-frame indicating a subject region detected by the tracking circuit 114 is stored to the video memory.

Note that the tracking-frame superimposing circuit 119 may superimpose on display image data not only tracking-frames but also images such as icons and numerical values indicating the state of the digital camera 101, information for assisting image-shooting, etc. For example, the tracking-frame superimposing circuit 119 may superimpose, on display image data, data of images indicating the current exposure conditions (sensitivity, aperture value, shutter speed, etc.), the operation mode, the residual recording medium capacity (the number of pictures that can be recorded, recordable time, etc.), the residual battery capacity, etc.

The display device 120 reads image data stored in the video memory of the tracking-frame superimposing circuit 119, and displays an image expressed by the read image data on a display device that is an LCD panel or an organic EL panel, for example. Thus, an image (live-view image) having a tracking-frame superimposed thereon is displayed on the display device 120.

Figure 2:
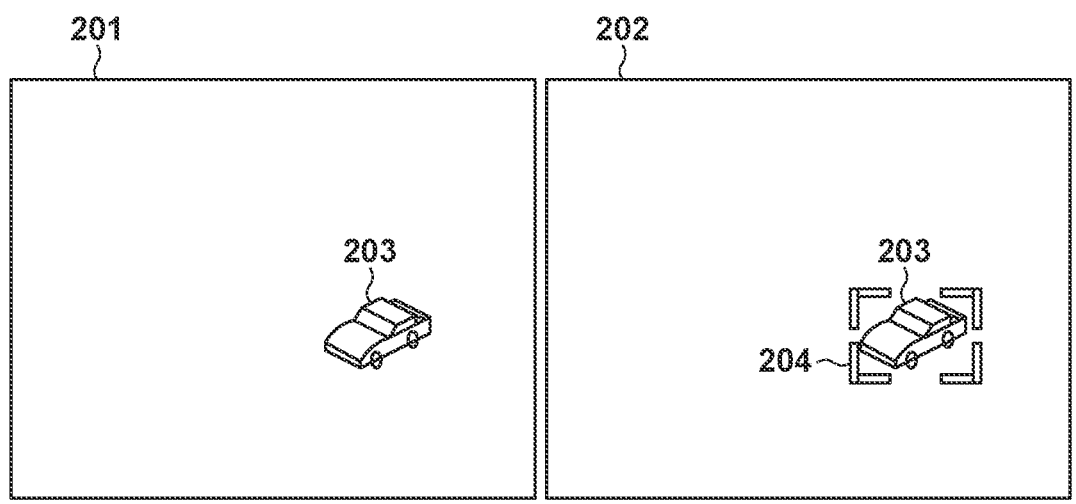
FIG. 2 is a diagram illustrating an example of live-view display performed by a display unit.

FIG. 2 illustrates an example of an image 201 based on display image data output by the post-processing circuit 113 and an image 202 obtained as a result of the tracking-frame superimposing circuit 119 superimposing a tracking-frame. Note that the shape of the tracking-frame is one example, and the tracking-frame may be a frame without any interruptions. Furthermore, the tracking-frame does not necessarily have to be frame shaped as long as the boundaries of a rectangular region can be roughly ascertained. For example, the tracking-frame may be a pattern formed from four dot-shaped markers indicating the four vertices of a rectangular region.

Next, operations of the digital camera 101 for providing a subject tracking function while performing live-view display will be described with reference to the time chart illustrated in FIG. 3. Times t301 to t307 indicate start timings of frame periods. At each of times t301 to t307, image-shooting processing of a frame is executed, and processing of the image data obtained as a result of the image-shooting is also started. That is, an interval between adjacent times of the times t301 to t307 corresponds to one frame period. Note that, while processing performed by the pre-processing circuit 105, the correction circuit 110, and the post-processing circuit 113 is not illustrated in FIG. 3, the operations by these units are executed in parallel, and display image data is output from the post-processing circuit 113 so as to be sufficient with respect to the display frame rate. Furthermore, the tracking pre-processing circuit 106 and the tracking correction circuit 107 also generate tracking image data so as to be sufficient with respect to the display frame rate, and store the tracking image data to the tracking memory 109.

Here, the live-view display frame rate is 120 fps, and thus display processing is executed at a $1/120$ second (8.33 msec) cycle. On the other hand, autofocus processing (optical control processing and lens driving processing) is executed at a $1/60$ second (16.66 msec) cycle. Furthermore, results of ML tracking processing, from which results with higher accuracy than those of non-ML tracking processing can be obtained, are used to set the focus detection region in autofocus processing.

Note that the frequency (operation cycle) of autofocus processing may be set so that ML tracking processing can catch up therewith. Alternatively, the processing capacity of the ML tracking circuit 115 may be set so as to be sufficient with respect to the frequency of autofocus processing. However, the frequency of autofocus processing does not exceed the frequency of display processing (display-device frame rate), and the frequency of autofocus processing is usually lower than that of display processing.

The tracking control circuit 112 determines whether each of the ML tracking circuit 115 and the non-ML tracking circuit 116 is to be activated or deactivated based on the relationship between one frame period and the time required for tracking processing by each of the ML tracking circuit 115 and the non-ML tracking circuit 116. Here, the time required for tracking processing by the ML tracking circuit 115 is longer than one frame period and shorter than two frame periods, and, on the other hand, the time required for tracking processing by the non-ML tracking circuit 116 is shorter than one frame period. Furthermore, the tracking control circuit 112 determines that the processing results of the ML tracking circuit 115 are to be used for autofocus processing, and the processing results of the non-ML tracking circuit 116 are to be used to superimpose tracking-frames onto a live-view image in display processing. Accordingly, the tracking control circuit 112 controls the operation of the tracking circuit 114 so that the non-ML tracking circuit 116 is activated for each frame and the ML tracking circuit 115 is activated for every other frame.

At time t301, the subject detection circuit 111 starts to perform subject detection processing 310 on tracking image data for a first frame. Before completion of subject detection processing 310, display image data for the first frame is generated and output from the post-processing circuit 113 to the tracking-frame superimposing circuit 119. Upon completion of subject detection processing 310, the tracking-frame superimposing circuit 119 executes tracking-frame superimposing processing 311 in accordance with the detection result. Subsequently, starting from time t302, the tracking-frame superimposing circuit 119 executes display processing 312 on the display device 120. Tracking processing is not executed for the first frame.

Furthermore, at time t302, processing of tracking image data for a second frame is started. For the second frame, which is the first frame for which tracking processing is executed, the tracking control circuit 112 activates both the ML tracking circuit 115 and the non-ML tracking circuit 116 included in the tracking circuit 114. Furthermore, the ML tracking circuit 115 and the non-ML tracking circuit 116 execute ML tracking processing 313 and non-ML tracking processing 314 in parallel for the second frame.

Because non-ML tracking processing 314 completes within one frame period, the result of non-ML tracking processing 314 can be used for tracking-frame superimposing processing for the second frame. Upon completion of non-ML tracking processing 314, the non-ML tracking circuit 116 outputs, to the tracking-frame superimposing circuit 119, information of the position and size of a subject region in the image for the second frame as a processing result. Then, the tracking-frame superimposing circuit 119 starts tracking-frame superimposing processing 315. The tracking-frame superimposing circuit 119 determines the size and position of a tracking-frame to be superimposed on the live-view image based on the processing result acquired from the tracking circuit 114 (the non-ML tracking circuit 116 in this case). Furthermore, the tracking-frame superimposing circuit 119 superimposes image data of the tracking-frame on display image data for the second frame obtained from the post-processing circuit 113. Subsequently, at time t303, the tracking-frame superimposing circuit 119 executes display processing 316 on the display device 120 based on the display image data for the second frame.

Furthermore, at time t303, the tracking circuit 114 starts to perform non-ML tracking processing 317 using the non-ML tracking circuit 116 on tracking image data for a third frame. Because the ML tracking circuit 115 is executing tracking processing for the second frame at time t303, only the non-ML tracking circuit 116 executes tracking processing for the third frame. Because non-ML tracking processing 317 and tracking-frame superimposing processing 318 based on the result of non-ML tracking processing 317 are similar to those for the second frame, description thereof is omitted.

ML tracking processing 313 for the second frame is completed between times t303 and t304. The ML tracking circuit 115 outputs, to the control circuit 103, information of the position and size of the subject region in the image for the second frame as a processing result. Because tracking-frame superimposing processing for the second frame has already been completed, the ML tracking circuit 115 outputs the processing result only to the control circuit 103.

Upon acquiring the processing result from the ML tracking circuit 115, the control circuit 103 executes optical control processing 320 using the processing result. Here, the control circuit 103 uses the processing result from the ML tracking circuit 115 to set the focus detection region and determine the exposure conditions. Specifically, based on the subject-region position and size obtained as a result of tracking processing, the control circuit 103 sets the focus detection region so as to include the subject region. For example, if the size of the focus detection region determined in advance is smaller than the size of the subject region, the control circuit 103 sets the focus detection region inside the subject region. Furthermore, if the size of the focus detection region is larger than the size of the subject region, the control circuit 103 sets the focus detection region so that the subject region is positioned in the center of the focus detection region. Note that the control circuit 103 may set a focus detection region including the subject region according to other methods.

Furthermore, the control circuit 103 may determine the exposure conditions so that the subject region is appropriately exposed. For example, the control circuit 103 may use the average luminance value in the subject region as an Ev value, and determine a combination of an aperture value, a shutter speed, and photosensitivity using a program diagram. Note that the control unit 103 may determine exposure conditions in which the subject region is taken into consideration according to other methods.

The control circuit 103 acquires a pair of signals for the focus detection region that has been set from the AF sensor 123, and acquires a defocus amount based on the phase difference between the pair of signals. Furthermore, in accordance with the determined exposure conditions, the control circuit 103 controls the exposure period and gain value of the image sensor 104, and the aperture value of the optical system 102 (performs AE processing).

Upon completion of optical control processing 320, the control circuit 103 executes lens driving processing 321 based on the defocus amount acquired in optical control processing 320. Thus, the in-focus distance of the optical system 102 is adjusted so that the optical system 102 is focused on the focus detection region set in optical control processing 320. Note that optical control processing 320 is executed spanning start time t304 of a fourth frame. Thus, AF processing based on ML tracking processing performed on the tracking image data for the second frame is reflected in the image-shooting of a fifth frame started from time t305.

During the execution of optical control processing 320, at time t304, display processing 319 based on tracking-frame superimposing processing 318 and image-shooting of the fourth frame are executed. Because the ML tracking circuit 115 is available at time t304, the tracking control circuit 112 activates both the ML tracking circuit 115 and the non-ML tracking circuit 116 for tracking image data of the fourth frame, similarly to the case for the second frame. Furthermore, the ML tracking circuit 115 and the non-ML tracking circuit 116 execute ML tracking processing 322 and non-ML tracking processing 323 in parallel for the fourth frame.

Non-ML tracking processing 323 and tracking-frame superimposing processing 324 are completed by time t305, and display processing 325 based on tracking-frame superimposing processing 324 and image-shooting of the fifth frame are executed at time t305. Because the ML tracking circuit 115 is executing tracking processing for the fourth frame at time t305, only non-ML tracking processing 326 is executed and ML tracking processing is not executed for the fifth frame. Upon completion of non-ML tracking processing 326, tracking-frame superimposing processing 327 is executed.

ML tracking processing 322 is completed between time t305 and t306, and optical control processing 329 is started. Optical control processing 329 is executed spanning time t306.

At time t306, display processing 328 based on tracking-frame superimposing processing 327 and image-shooting of a sixth frame are executed. Because the ML tracking circuit 115 is available at time t306, the tracking control circuit 112 activates both the ML tracking circuit 115 and the non-ML tracking circuit 116 for tracking image data of the sixth frame, similarly to the case for the second and fourth frames. Furthermore, the ML tracking circuit 115 and the non-ML tracking circuit 116 execute ML tracking processing 331 and non-ML tracking processing 332 in parallel for the sixth frame.

Subsequently, lens driving processing 330 based on optical control processing 329 and tracking-frame superimposing processing 333 based on non-ML tracking processing 332 are executed, and time t307 arrives. Processing is continued in a similar manner for subsequent frames.

In such a manner, the digital camera 101 according to the present embodiment achieves both tracking responsiveness of tracking-frame display and accurate AF processing by using, depending on the situation, the ML tracking circuit 115, which executes ML-based tracking processing, and the non-ML tracking circuit 116, which executes tracking processing without using machine learning. Furthermore, power consumption can be cut down by reducing the operation frequency of the ML tracking circuit 115 compared to that of the non-ML tracking circuit 116.

Modification 1

Figure 3:
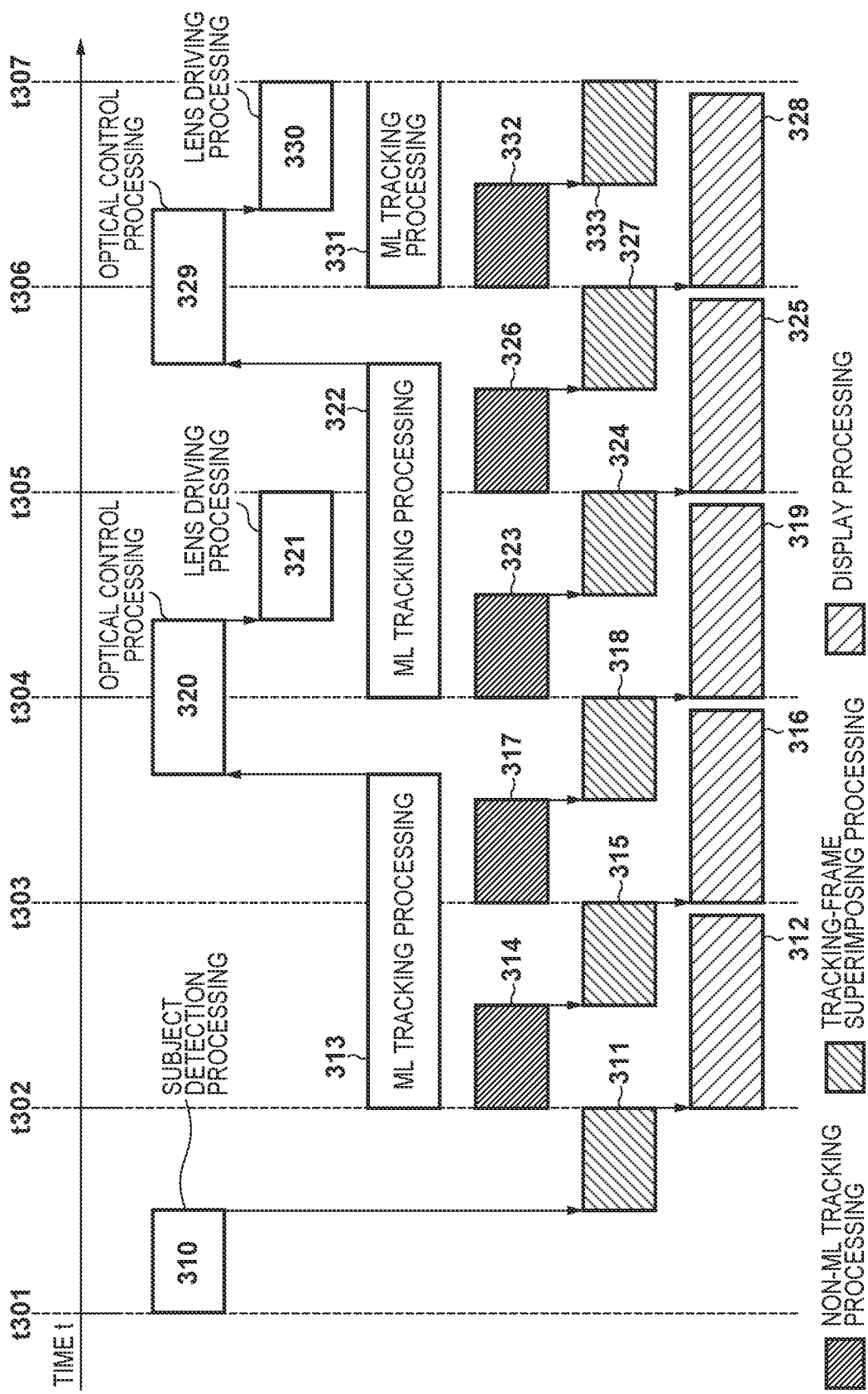
FIG. 3 is a timing chart relating to one example of a subject tracking function in the embodiment.
Figure 4:
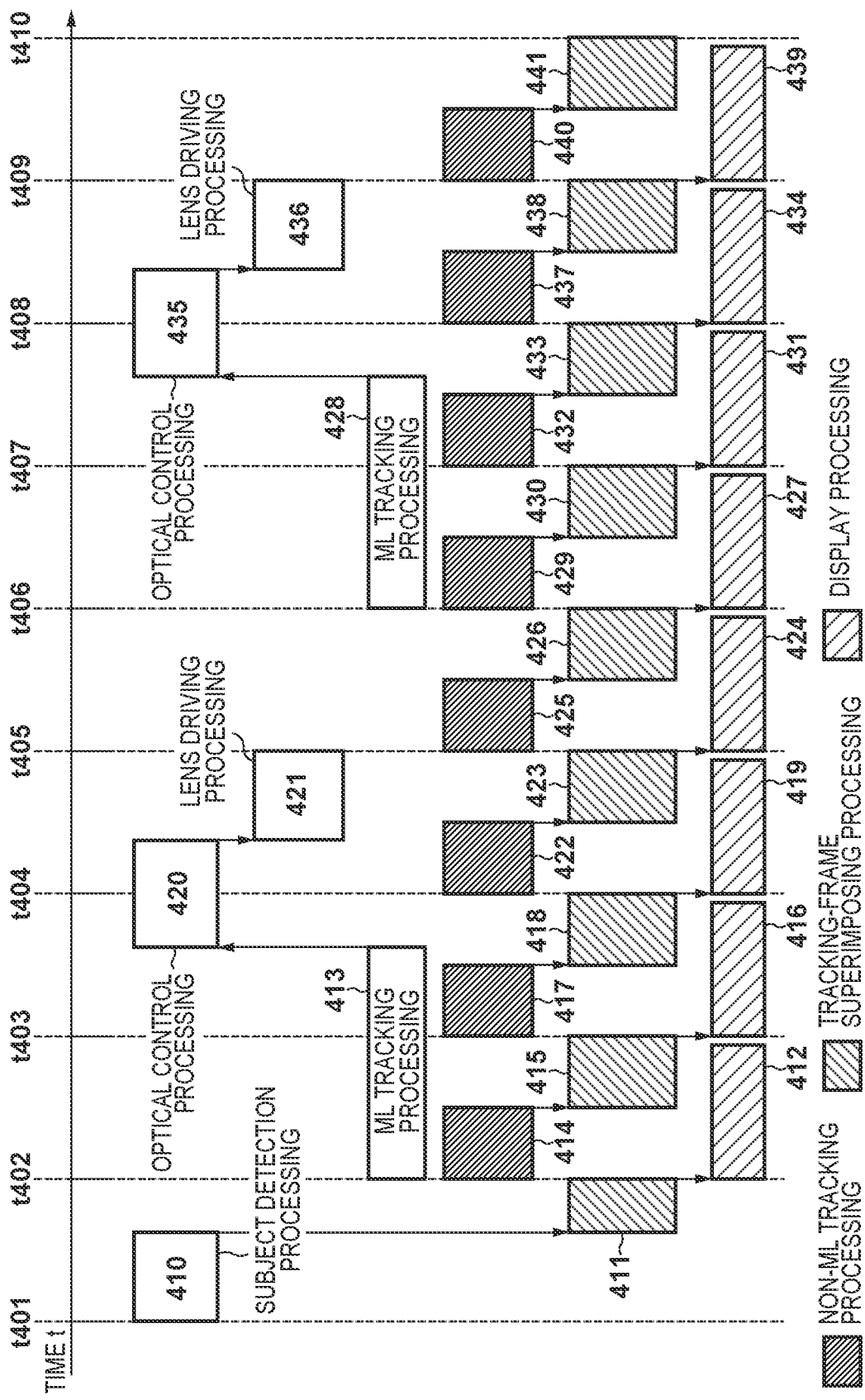
FIG. 4 is a timing chart relating to another example of the subject tracking function in the embodiment.

FIG. 4 illustrates another example of a time chart relating to the operations of the digital camera 101 for providing the subject tracking function while performing live-view display. The present modification corresponds to a case in which the frequency of autofocus processing is reduced in the example illustrated in FIG. 3, and autofocus processing is executed at a 1/30 second (33.33 msec) cycle. On the other hand, display processing is executed at a 1/120 second (8.33 msec) cycle (frequency). In the present modification as well, the post-processing circuit 113 and the tracking correction circuit 107 generate display image data and tracking image data so as to be sufficient with respect to the display frame rate.

The operations illustrated in FIG. 4 may be executed, for example, when the operation mode of the digital camera 101 is set to an operation mode for reducing power consumption. However, the operations illustrated in FIG. 4 may be executed under other conditions. For example, the operations illustrated in FIG. 4 may be executed when the control circuit 103 detects a match with a predetermined condition under which the operation frequency of the ML tracking circuit 115 is to be reduced. The condition under which the operation frequency of the ML tracking circuit 115 is to be reduced may be when the residual capacity of a battery supplying power to the digital camera 101 has decreased to a predetermined threshold, or when the movement of a tracked subject within the latest predetermined period of time is equal to or less than a threshold.

In the present modification, times t401 to t410 indicate start timings of frame periods. Furthermore, because processing with the same name as that in FIG. 3 is the same processing as that described in relation to FIG. 3, description thereof is omitted. The processing speeds of the ML tracking circuit 115 and the non-ML tracking circuit 116 are also the same as those in FIG. 3.

Processing 410 to 423 in FIG. 4 is the same as processing 310 to 321, 323, and 324 in FIG. 3. In the present modification, ML tracking processing, optical control processing, and lens driving processing are not executed at time t404 (fourth frame). Because autofocus processing is executed at a frequency of once every four frames, second ML tracking processing 428 is executed at time t406 (sixth frame) after first ML tracking processing 413 is executed at time t402 (second frame).

Then, as autofocus processing corresponding to image-shooting of a sixth frame started at time t406, optical control processing 435 and lens driving processing 436 are executed continuously after second ML tracking processing 428.

On the other hand, non-ML tracking processing 425, 429, 432, 437, and 440, tracking-frame superimposing processing 426, 430, 433, 438, and 441, and display processing 424, 427, 431, 434, and 439 are executed for the fifth to ninth frames. Thus, tracking-frames are superimposed on all frames of a live-view image displayed at the 120-fps frame rate, and a user can check the tracking state in real time.

In such a manner, by executing ML tracking processing at the cycle of autofocus operations and executing non-ML tracking processing at the cycle of display operations (display frame rate), the frequency of ML tracking processing can be suppressed and power consumption can be reduced while maintaining tracking-frame responsiveness.

Modification 2

Figure 5:
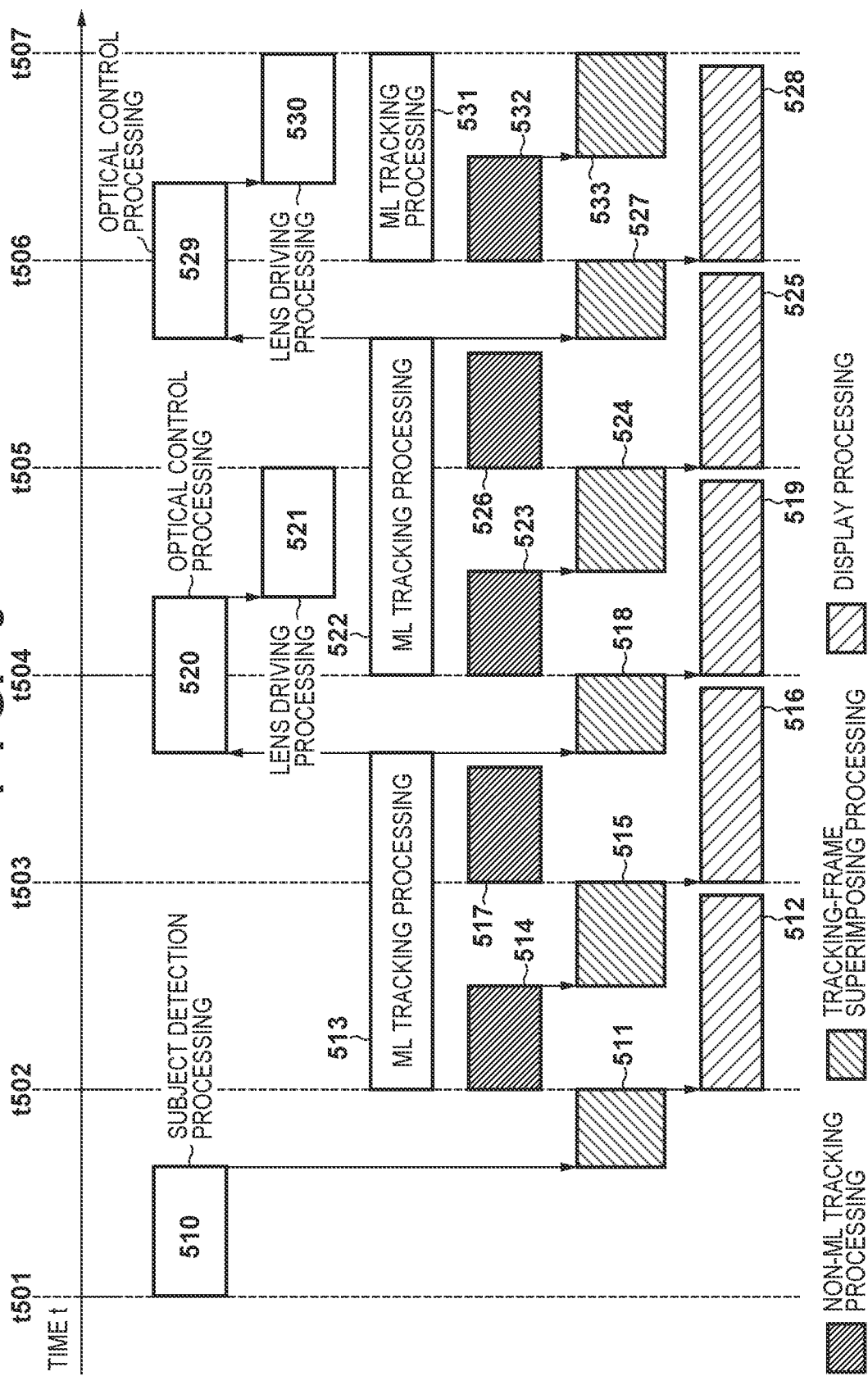
FIG. 5 is a timing chart relating to yet another example of the subject tracking function in the embodiment.

FIG. 5 illustrates yet another example of a time chart relating to the operations of the digital camera 101 for providing the subject tracking function while performing live-view display. In the present modification, the execution frequencies of autofocus processing and tracking-frame superimposing processing are the same as those in the example in FIG. 3. The present modification differs from the example in FIG. 3 in that ML tracking processing results are used for tracking-frame superimposing processing.

Because processing 510 to 533 in FIG. 5 is the same as processing 310 to 333 in FIG. 3, description of individual processing is omitted. The present modification differs from the example in FIG. 3 in that tracking-frame superimposing processing is executed using ML tracking processing results, if available. FIG. 5 illustrates an example in which a configuration is adopted such that a result of ML tracking processing is used for tracking-frame superimposing processing executed in the frame period in which the ML tracking processing is completed.

Accordingly, a result of ML tracking processing 513, rather than a result of non-ML tracking processing 517, is used in tracking-frame superimposing processing 518 executed in the third frame period (time t503 to time t504), in which ML tracking processing 513 is completed. Similarly, a result of ML tracking processing 522, rather than a result of non-ML tracking processing 526, is used in tracking-frame superimposing processing 527 executed in the fifth frame period (time t505 to time t506), in which ML tracking processing 522 is completed.

Note that, if tracking-frame superimposing processing cannot be completed within a period from when ML tracking processing is completed to the start of the next frame period, the result of the ML tracking processing may be used in tracking-frame superimposing processing executed in the frame period subsequent to the frame period in which the ML tracking processing is completed. In this case, in tracking-frame superimposing processing executed in the frame period in which the ML tracking processing is completed, the result of non-ML tracking processing executed in the same frame period is used.

ML tracking processing has higher accuracy than non-ML tracking processing. Furthermore, ML tracking processing results are used for autofocus processing. Thus, as a result of ML tracking processing results being used for tracking-frame superimposing processing, tracking-frames having higher conformity with the focus detection region can be displayed. Furthermore, for frames for which ML tracking processing results cannot be obtained, tracking-frames are superimposed using non-ML tracking processing results. Thus, tracking-frame display with high responsiveness can be realized.

Furthermore, the time required for ML tracking processing and tracking-frame superimposing processing can be statistically predicted. Thus, it can be ascertained beforehand for which frames tracking-frame superimposing processing will be performed using ML tracking processing. Accordingly, the tracking control circuit 112 may deactivate the non-ML tracking circuit 116 in frame periods in which ML tracking processing results will be used for tracking-frame superimposing processing. Power consumption can thus be reduced.

Figure 6:
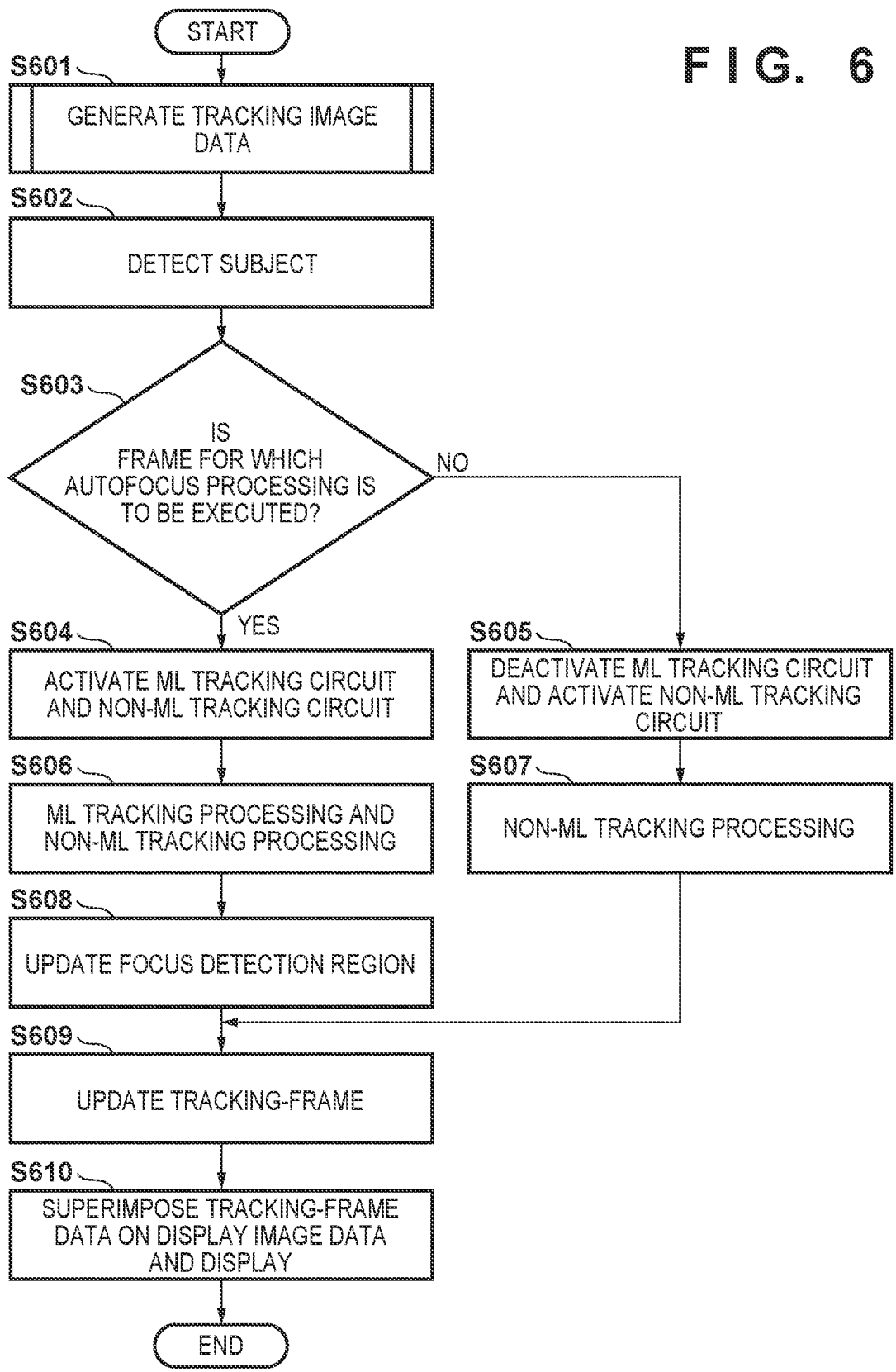
FIG. 6 is a flowchart relating to the subject tracking function in the embodiment.
Figure 7:
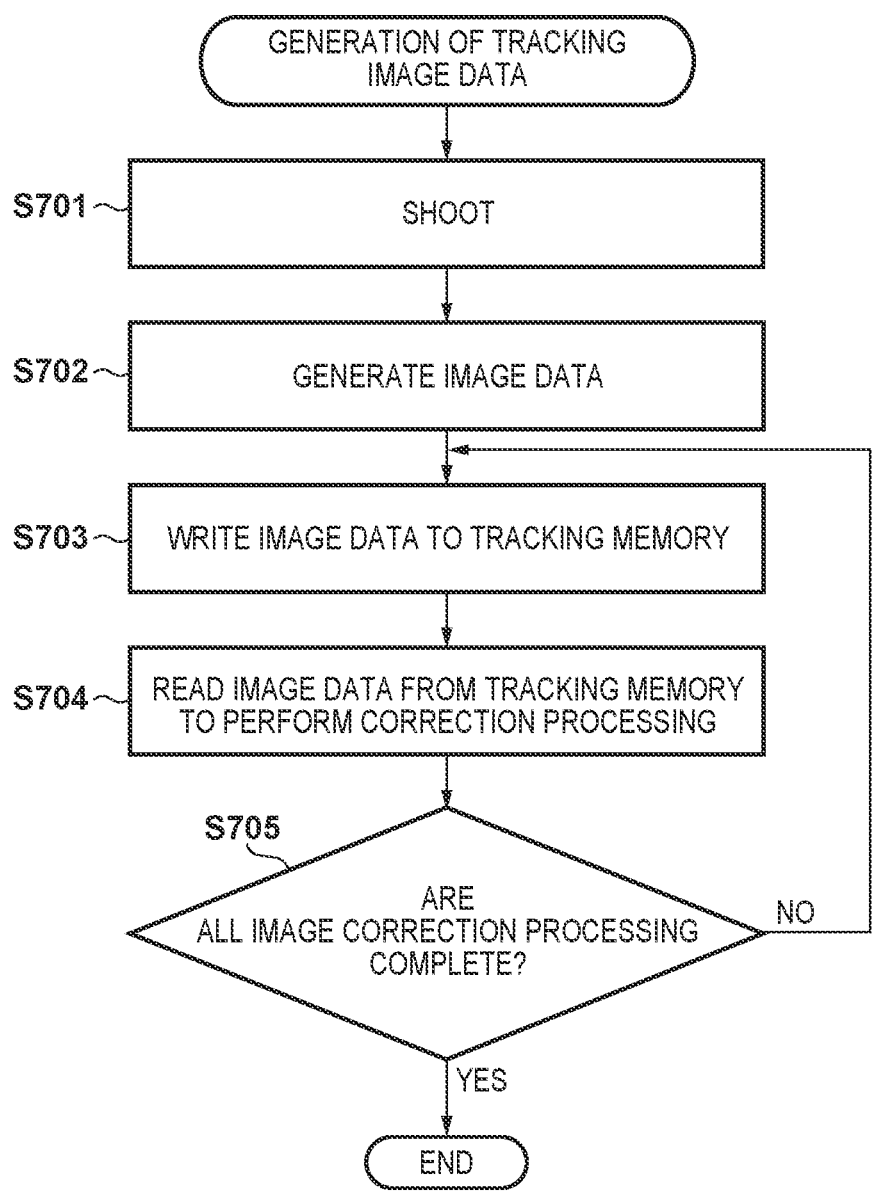
FIG. 7 is a flowchart relating to the subject tracking function in the embodiment.

With reference to the flowcharts illustrated in FIGS. 6 and 7, further description will be provided for the operations of the digital camera 101 relating to the subject tracking processing having been described with reference to FIGS. 3 to 5. The subject tracking processing is performed on images shot in time series (a moving image or continuously shot still images). The user may be able to explicitly set whether the subject tracking processing is to be activated or not. Furthermore, the subject tracking processing may be automatically activated in accordance with the image-shooting mode setting, etc.

In step S601, the digital camera 101 shoots one frame and generates tracking image data. FIG. 7 is a flowchart regarding the details of step S601.

In step S701, the control circuit 103 controls the operation of the image sensor 104 in accordance with the exposure conditions determined in the AE processing, and causes the image sensor 104 to shoot one frame. The image sensor 104 outputs the analog image signal obtained as a result of the image-shooting to the pre-processing circuit 105 and the tracking pre-processing circuit 106.

In step S702, the tracking pre-processing circuit 106 generates image data from the analog image signal as described above.

In step S703, the tracking pre-processing circuit 106 writes the generated image data to the tracking memory 109.

In step S704, the tracking correction circuit 107 applies correction processing to the image data as described above.

In step S705, the tracking correction circuit 107 determines whether or not all the correction processing to be applied has been applied. If it is determined that unapplied correction processing is remaining, the tracking correction circuit 107 repeats steps S703 and S704 to apply the unapplied image processing. On the other hand, if it is determined that all the correction processing to be applied has been applied, the tracking correction circuit 107 writes the image data to which the correction processing has been applied to the tracking memory 109 as tracking image data, and terminates the processing for generating tracking image data.

Note that, in parallel with the generation of tracking image data, the pre-processing circuit 105, the correction circuit 110, and the post-processing circuit 113 generate display image data (and also recording image data depending upon the purpose of image-shooting) from the analog image signal obtained in step S701.

Returning to FIG. 6, in step S602, the subject detection circuit 111 applies subject detection processing for detecting a region corresponding to a predetermined type of subject to the tracking image data stored in the tracking memory 109. The subject detection circuit 111 writes the position, size, etc., of the detected subject region to the tracking memory 109 as a subject detection result.

In step S603, the tracking control circuit 112 determines whether or not the current frame is a frame for which autofocus (AF) tracking processing is to be executed. The execution frequency of the AF tracking processing (the interval, in terms of the number of frames, at which the AF tracking processing is to be executed) is determined in advance. Thus, the tracking control circuit 112 can determine whether or not the current frame is a frame for which the AF tracking processing is to be executed based on a count value of a counter whose value increases for each frame, for example. For example, in the example illustrated in FIG. 3, in which the AF tracking processing is executed every two frames, the tracking control circuit 112 may determine that the current frame is a frame for which the AF tracking processing is to be executed if the count value is an even number.

The tracking control circuit 112 executes step S604 if it is determined that the current frame is a frame for which the AF tracking processing is to be executed, and otherwise executes step S605.

In step S604, the tracking control circuit 112 activates both the ML tracking circuit 115 and the non-ML tracking circuit 116, and sets up the tracking circuit 114 or provides a notification to the tracking circuit 114 accordingly.

In step S605, the tracking control circuit 112 deactivates the ML tracking circuit 115 and activates the non-ML tracking circuit 116, and sets up the tracking circuit 114 or provides a notification to the tracking circuit 114 accordingly.

In step S606, the tracking circuit 114 performs the ML tracking processing and the non-ML tracking processing on the tracking image data of the current frame using the ML tracking circuit 115 and the non-ML tracking circuit 116.

In step S608, the control circuit 103 updates the focus detection region by executing optical control processing based on a result of the ML tracking processing, out of the tracking processing executed in step S606. Furthermore, the control circuit 103 executes lens driving processing and adjusts the in-focus distance of the optical system 102 so that the optical system 102 is focused on the updated focus detection region.

In step S607, the tracking circuit 114 performs the non-ML tracking processing on the tracking image data of the current frame using the non-ML tracking circuit 116.

In step S609, the tracking-frame superimposing circuit 119 updates tracking-frame position and size based on a result of the non-ML tracking processing in step S606 or S607, or the result of the ML tracking processing in step S606.

In step S610, the tracking-frame superimposing circuit 119 generates image data of the updated tracking-frame, superimposes the generated image data on the display image data output by the post-processing circuit 113, and displays the resulting image data on the display device 120. This concludes subject tracking processing for one frame. After this point, the digital camera 101 repeats the same processing for each frame.

As described above, according to the present embodiment, an image processing apparatus that includes an ML tracking circuit that executes ML-based tracking processing and a non-ML tracking circuit that executes tracking processing without using machine learning is configured so that the operation frequency of the ML tracking circuit is lower than that of the non-ML tracking circuit. Thus, an increase in power consumption caused by operating the ML tracking circuit can be suppressed. Furthermore, by using the processing results of the ML tracking circuit for autofocus processing, autofocus processing based on accurate tracking results can be realized.

OTHER EMBODIMENTS

Note that, in the examples illustrated in FIGS. 3 to 7, in order to facilitate description and understanding, the frequency of the ML tracking processing and the autofocus processing is determined assuming that the ML tracking processing will be used for autofocus processing. However, the essence of the present invention lies in that a non-ML tracking circuit is included in addition to an ML tracking circuit, and the results of non-ML tracking processing are used for frames for which ML tracking processing cannot be completed in time. Thus, the ML tracking processing does not need to be completed within one frame period, and a reduction in power consumption can be realized. Furthermore, processing using the results of the non-ML tracking processing can be performed for frames for which the results of the ML tracking processing are not available, and thus tracking-frame superimposing processing having excellent responsiveness can be realized for display performed at a high frame rate, for example.

Accordingly, a configuration may be also adopted such that both the ML tracking circuit and the non-ML tracking circuit are both activated at all times, and the results of the non-ML tracking processing are used for frames for which the ML tracking processing cannot be completed in time, whereas the results of the ML tracking processing are used for frames corresponding to times when the results of the ML tracking processing are obtained. In this case, processing in which the results of the non-ML tracking processing are used and processing in which the results of the ML tracking processing are used may be the same as or different from one another.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-72675, filed on Apr. 26, 2022, which is hereby incorporated by reference herein in its entirety.

What is claimed is:

1. An image processing apparatus comprising:
one or more processors that execute a program stored in a memory which cause the image processing apparatus to:
apply machine learning (ML)-based first tracking processing to images, wherein a result of the first tracking processing used is autofocus processing; and
apply non-ML-based second tracking processing to the images,
wherein an operation frequency of the first tracking processing to be lower than an operation frequency of the second tracking processing by deactivating the first tracking processing for an image to which the autofocus processing is not performed.

2. The image processing apparatus according to claim 1, wherein the images are for display, and a result of the second tracking processing are used for live-view display.

3. The image processing apparatus according to claim 2, wherein the result of the second tracking processing is used to superimpose an image to indicate a tracked subject on the live-view display.

4. The image processing apparatus according to claim 2, wherein if a result of the first tracking processing is available, it is used for the live-view display.

5. The image processing apparatus according to claim 1, wherein the images are frames of a moving image, the second tracking processing is applied every frame, and the first tracking processing is applied once every plurality of frames.

6. The image processing apparatus according to claim 5, wherein the second tracking processing is not applied to a frame for which a result of the first tracking processing is available.

7. The image processing apparatus according to claim 5, wherein the number of the plurality of frames when the image processing apparatus satisfies a predetermined condition is more than the number of the plurality of frames when the image processing apparatus does not satisfy the predetermined condition.

8. The image processing apparatus according to claim 7, wherein the predetermined condition is that the image processing apparatus is set to an operation mode for reducing power consumption.

9. The image processing apparatus according to claim 1, wherein the autofocus processing uses a focus detection region set in accordance with a result of the first tracking processing.

10. The image processing apparatus according to claim 1, wherein the machine learning is deep learning.

11. The image processing apparatus according to claim 1, wherein the second tracking processing is based on pattern matching.

12. The image processing apparatus according to claim 1, wherein a time required to perform the first tracking processing to an image is not greater than an operation cycle of the autofocus processing.

13. An image processing apparatus comprising:
one or more processors that execute a program stored in a memory and thereby causes the image processing apparatus to:
acquire images having a predetermined frame rate;
apply machine learning (ML)-based first tracking processing to the images;
apply non-ML-based second tracking processing to the images; and
execute processing in which a result of the first tracking processing or the second tracking processing is used,
wherein a time required for the first tracking processing is longer than one frame period of the images, and a time required for the second tracking processing is shorter than the one frame period, and
if results of the first and second tracking processing are available at a start of a process performed for every frame, the result of the first tracking processing rather than the result of the second tracking processing is used even if the result of the first tracking process is for an older frame than a frame for which the result of the second tracking processing for a previous frame is available.

14. An image capture apparatus comprising:
an image sensor; and
an image processing apparatus using images obtained by the image sensor,
wherein the image processing apparatus comprising:
one or more processors that execute a program stored in a memory and thereby causes the image processing apparatus to:
apply machine learning (ML)-based first tracking processing to images, wherein a result of the first tracking processing used is autofocus processing;
apply non-ML-based second tracking processing to the images; and
control operations of the first and second tracking units,
wherein an operation frequency of the first tracking processing to be lower than an operation frequency of the second tracking processing by deactivating the first tracking processing for an image to which the autofocus processing is not performed.

15. An image capture apparatus comprising:
an image sensor; and
an image processing apparatus using an image obtained by the image sensor,
wherein the image processing apparatus comprising:
one or more processors that execute a program stored in a memory and thereby causes the image processing apparatus to:
acquire images having a predetermined frame rate;
apply machine learning (ML)-based first tracking processing to the images;
apply non-ML-based second tracking processing to the images; and
execute processing in which a result of the first tracking processing or the second tracking processing is used,
wherein a time required for the first tracking processing is longer than one frame period of the images, and a time required for the second tracking processing is shorter than the one frame period, and
if results of the first and second tracking processing are available at a start of a process performed for every frame, the result of the first tracking processing rather than the result of the second tracking processing are used even if the result of the first tracking process is for an older frame than a frame for which the result of the second tracking processing for a previous frame is available.

16. An image processing method to be executed by an image processing apparatus, the image processing apparatus including a first tracking circuit configured to apply machine learning (ML)-based first tracking processing to images and a second tracking circuit configured to apply non-ML-based second tracking processing to the images, wherein a result of the first tracking processing used is autofocus processing and the image processing method comprising:
  controlling operations of the first and second tracking circuits so that an operation frequency of the first tracking circuit to be lower than an operation frequency of the second tracking circuit by deactivating the first tracking circuit for an image to which the autofocus processing is not performed.

17. A non-transitory machine-readable medium that has stored therein a program for causing a computer to function as an image processing apparatus comprising the operations of:
  applying machine learning (ML)-based first tracking processing to images, wherein a result of the first tracking processing used is autofocus processing;
  applying non-ML-based second tracking processing to the images; and
  controlling operations of the first and second tracking units,
  wherein an operation frequency of the first tracking processing to be lower than an operation frequency of the second tracking processing by deactivating the first tracking processing for an image to which the autofocus processing is not performed.

18. A non-transitory machine-readable medium that has stored therein a program for causing a computer to function as an image processing apparatus comprising the operations of:
  acquiring images having a predetermined frame rate;
  applying machine learning (ML)-based first tracking processing to the images;
  applying non-ML-based second tracking processing to the images; and
  executing processing in which a result of the first tracking processing or the second tracking processing is used,
  wherein a time required for the first tracking processing is longer than one frame period of the images, and a time required for the second tracking processing is shorter than the one frame period, and
  if results of the first and second tracking processing are available at a start of a process performed for every frame, the result of the first tracking processing rather than the result of the second tracking processing is used even if the result of the first tracking process is for an older frame than a frame for which the result of the second tracking processing for a previous frame is available.

* * * * *